United States Patent
Du et al.

(10) Patent No.: US 9,836,894 B2
(45) Date of Patent: Dec. 5, 2017

(54) DISTRIBUTED VEHICLE HEALTH MANAGEMENT SYSTEMS

(71) Applicant: GM GLOBAL TECHNOLOGY OPERATIONS LLC, Detroit, MI (US)

(72) Inventors: Xinyu Du, Oakland Township, MI (US); Yilu Zhang, Northville, MI (US); Youssef A. Ghoneim, Rochester, MI (US); Shengbing Jiang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 14/958,020

(22) Filed: Dec. 3, 2015

(65) Prior Publication Data

US 2017/0161965 A1 Jun. 8, 2017

(51) Int. Cl.
| | | |
|---|---|---|
| *G06F 11/30* | (2006.01) | |
| *G07C 5/00* | (2006.01) | |
| *G06F 17/50* | (2006.01) | |
| *G07C 5/08* | (2006.01) | |
| *H04L 29/08* | (2006.01) | |

(52) U.S. Cl.
CPC .......... *G07C 5/008* (2013.01); *G06F 17/5009* (2013.01); *G07C 5/0808* (2013.01); *G06F 2217/76* (2013.01); *H04L 67/12* (2013.01)

(58) Field of Classification Search
CPC ...... G07C 5/006; G07C 5/008; G07C 5/0808; B64D 2045/0085; B60R 2021/01184; B60W 50/0205; B60W 10/20; B60W 50/023
USPC ... 701/29.3, 31.9, 36, 31.4, 29.1, 31.5, 34.4, 701/32.7; 714/25
See application file for complete search history.

(56) References Cited

U.S. PATENT DOCUMENTS

| | | | | |
|---|---|---|---|---|
| 2012/0296567 A1* | 11/2012 | Breed | .................... | G01C 21/26 701/468 |
| 2014/0257624 A1* | 9/2014 | Safa-Bakhsh | ........... | G06F 17/00 701/31.4 |
| 2015/0224997 A1* | 8/2015 | Glugla | ................ | F02D 41/2432 701/54 |
| 2016/0078695 A1* | 3/2016 | McClintic | .............. | G06Q 10/06 701/29.4 |

* cited by examiner

*Primary Examiner* — Dalena Tran
(74) *Attorney, Agent, or Firm* — Quinn IP Law (57) ABSTRACT

A distributed vehicle health management system includes a vehicle-based diagnostic processor executing diagnostic routines in a vehicle. The diagnostic routines generate diagnostic data. A processor-based device executes advanced vehicle health management routines. The processor-based device determines a state of health of a component as a function of the diagnostic data. A telematics device communicates at least one of state of health data and diagnostic data from the vehicle. A remote entity disposed remotely from the vehicle. The remote entity receives data via the telematics device, the data being a selective subset of data output from at least one of the vehicle-based processor and processor-based device. The remote entity executes calibration routines as a function of the data received by the vehicle for calibrating at least one of the diagnostic routines and health management routines.

23 Claims, 6 Drawing Sheets

DISTRIBUTED VEHICLE HEALTH MANAGEMENT SYSTEMS

BACKGROUND OF INVENTION

An embodiment vehicle health management system.

Distributed vehicle health management systems execute and calibrate algorithms both in the cloud. The data uploaded to the cloud may be limited for execution but is overflowed for calibration. Cost for data transmission and data processing in the cloud is excessive for certain component or system routines.

Conventional systems calibrate diagnostic algorithms only based on several vehicles in the production stage and are performed entirely on a vehicle ECU. Centralized systems collect all diagnostic trouble code and parameter identification code data and upload the entire sets of data to the cloud where advanced VHM algorithms are executed. This is a costly and computationally expensive process.

SUMMARY OF INVENTION

An advantage of an embodiment is reduction of transmitting large amounts of data from a vehicle or similar device to a remote entity for processing the data. The system and techniques described herein utilize a vehicle ECU or smartphone to obtain data from the vehicle and execute vehicle health management (VHM) routines for assessing a health of a component, subsystem, or system. A vehicle health management (VHM) system typically includes the following functions: diagnostics (detect, isolate (fault type), localize faults (where)), prognostics (predict a fault), and fault mitigation (change the operation of the component so that delay the failure). Based on the output of the vehicle health management routines, only specific selected sets of data are uploaded to a cloud for use by a remote entity to further calibrate vehicle health management algorithms or calibration of onboard diagnostic algorithms. As a result, the amount of data transmitted is reduced thereby providing only the necessary data needed to calibrate the VHM routines.

Moreover, VHM apps particularly when loaded on a smartphone, ECU, or similar can be readily updated without having to reflash an ECU to update the algorithms.

An embodiment contemplates a distributed vehicle health management system. A vehicle-based diagnostic processor executes diagnostic routines in a vehicle. The diagnostic routines generate diagnostic data. A processor-based device executes advanced vehicle health management routines. The processor-based device determines a state of health of a component as a function of the diagnostic data. A telematics device communicates at least one of a state of health data and diagnostic data from the vehicle. A remote entity is disposed remotely from the vehicle. The remote entity receives data via the telematics device. The data is a selective subset of data output from at least one of the diagnostic processor and processor-based device. The remote entity executes calibration routines as a function of the data received by the vehicle for calibrating at least one of diagnostic routines and health management routines.

DETAILED DESCRIPTION

Figure 1:
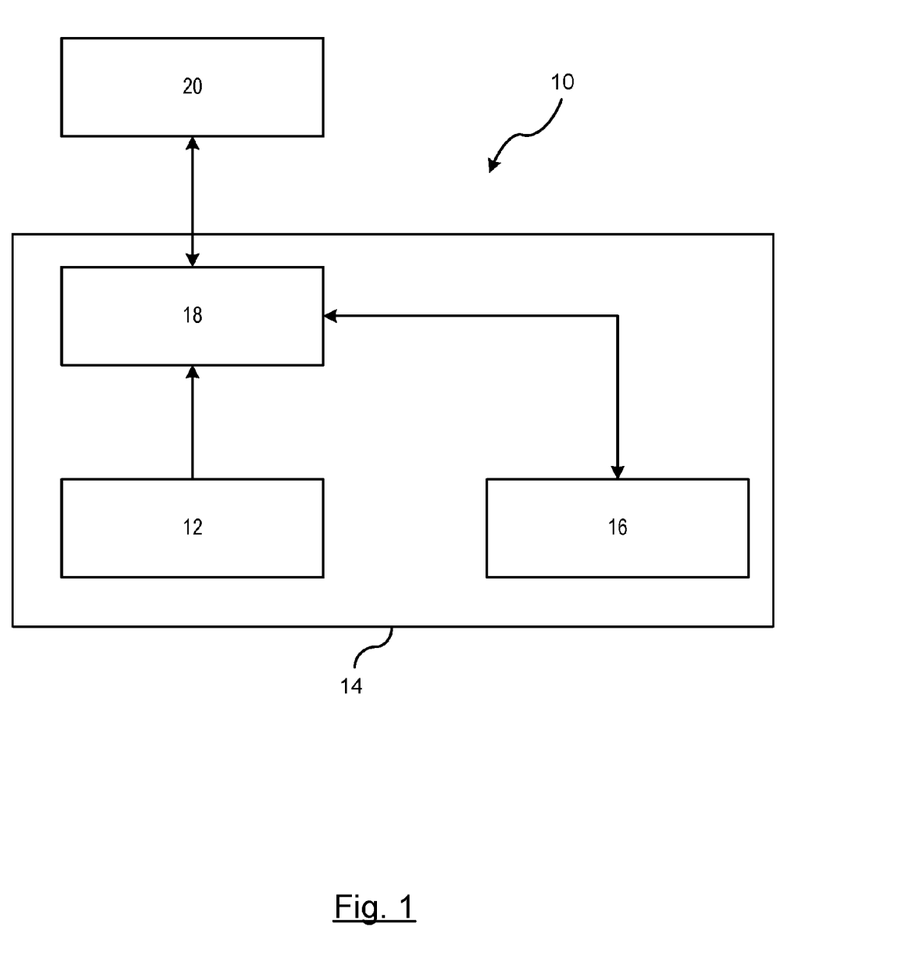
FIG. 1 is a block diagram of a distributed vehicle health management system.

FIG. 1 illustrates a block diagram of a distributed vehicle health management system 10. While the system as described herein refers to a vehicle, it should be understood that the system can be applied and utilized by a train, ship, airplane or any other system wherein diagnostic routines are executed.

The distributed vehicle health management (VHM) system 10 includes a diagnostic processor 12 for executing diagnostic routines in a vehicle 14. An example of diagnostic routines executed by onboard diagnostic algorithms may include, but are not limited to, engine operations wherein parameter identification codes (PIDs) and diagnostic trouble codes (DTCs) are generated.

DTCs are set in the vehicle based on onboard diagnostic algorithms. Service diagnostic tools retrieve DTCs from a vehicle processor memory and are used to determine the fault in the vehicle. Each of the processors in the vehicle includes a memory that stores DTCs when the vehicle experiences a fault and is detected. DTCs are alphanumeric codes that are used to identify a fault that occurs in various components within the vehicle. Such DTCs are related to various electrical vehicle functions that include, but are not limited to, engine operation, emissions, braking, powertrain, safety, and steering. Each subsystem may have its own on-board processor for monitoring faults of the subsystem operation or a processor may be responsible for monitoring faults for a plurality of subsystems. When the subsystem processor detects a fault, one or more DTCs are generated.

PIDs may be retrieved for determining specific information output by a sensor or similar device. A PID code is an operating parameter of a component that is recorded in a memory of an ECU or similar and is retrieved via the scan tool or a vehicle gateway module through a communication bus. One of the devices on the communication bus recognizes the PID code for which it is responsible and sends back information relating to the PID code for which provides further details relating to one or more of the devices sensing data relating to the detected fault.

A processor-based device 16 is a secondary processing device that executes advanced vehicle health management (VHM) algorithms. The advanced VHM algorithms utilize the DTC/PID data to further analyze the health of the vehicle system. The processor-based device 16 may be a portable communication device including, but not limited to, a smartphone or an HMI of the vehicle.

A telematics device 18 functions as a gateway for communicating data to and from the vehicle. The telematics device 18 may include any type of communication medium that allows data to be transmitted from the vehicle to a remote entity 20. The remote entity 20 may include a back office with memory, servers, and computing devices that allow selected data to be further processed for calibrating advanced VHM algorithms and calibrating onboard diagnostic algorithms. The remote entity 20 may utilize a cloud service or a fixed infrastructure.

Figure 2:
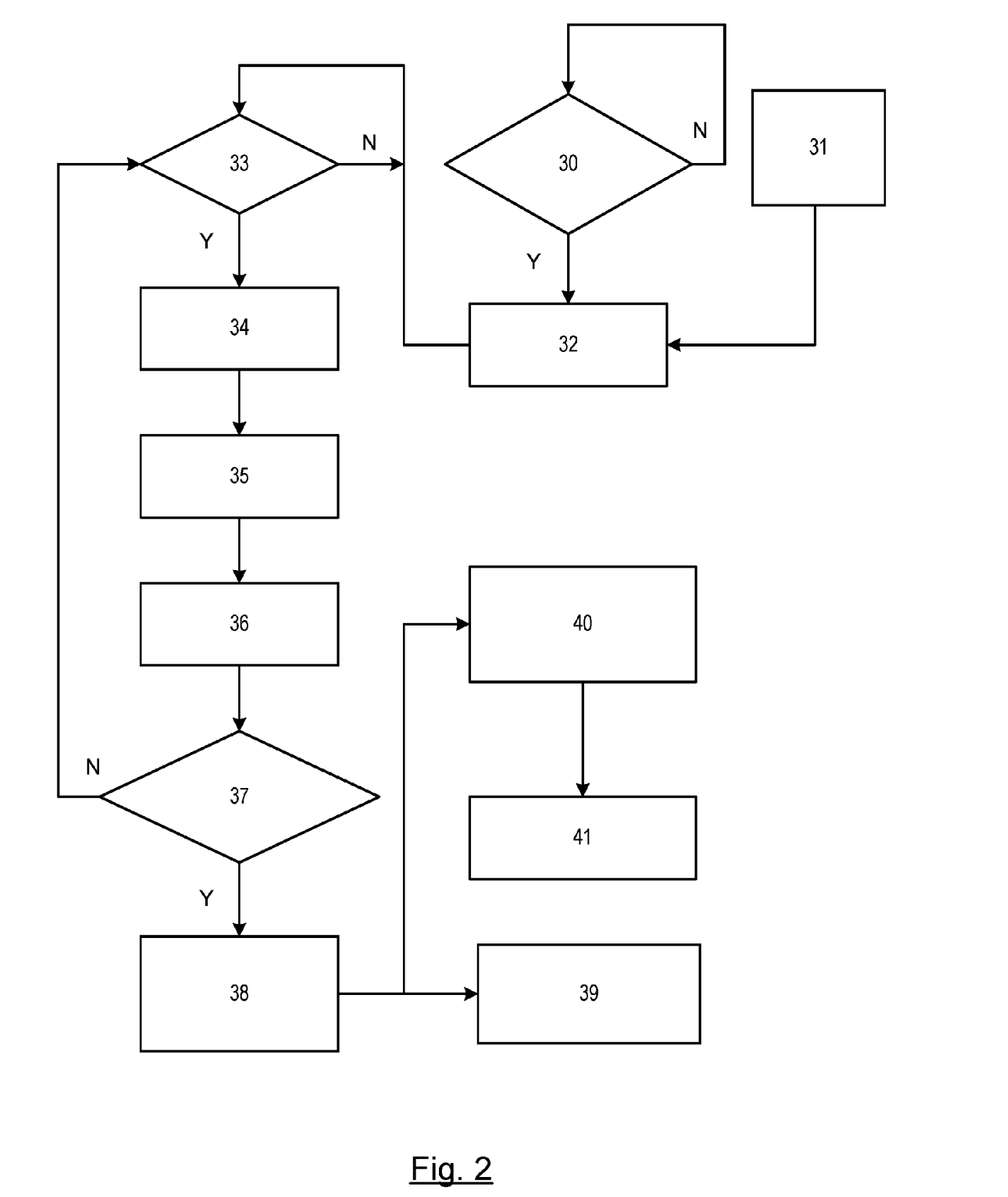
FIG. 2 is a flow chart of a block diagram for analyzing components and systems.

FIG. 2 illustrates a flow chart of a block diagram for analyzing components including, but not limited to, a battery, a starter, or fuel compld be understood that the term component as used herein is defined as a part, a set of parts, a subsystem, or a system.

In step 30, a determination is made as to whether there is a warranty without corresponding red alerts. Red alerts are determined from VHM algorithms. If the determination is made that the there is no warranty without corresponding red alerts, then the routine continues to loop and monitor for red alerts. If the determination is made that red alerts are present, then the routine proceeds to step 32.

In step 31, a fleet of vehicle identification numbers (VINs) for respective fleet vehicles is selected for data collection.

In step 32, in response to determining if there is a warranty without a corresponding red alert, the status of the VIN is set to upload data.

Steps 33-38 are executed by the processor-based device. In step 33, a determination is made as to whether a VHM algorithm is triggered. The VHM algorithm can be triggered either periodically or by an event. For example, a battery health check algorithm can be executed every time after cranking. In another example, a steering motor algorithm may be executed only when the customer turn the wheel, otherwise, there is not enough excitation to execute the steering algorithm. Referring again to step 33, if the determination is made that the VHM algorithm is not triggered, then a return is made to step 33. If the determination is made that the VHM algorithm is triggered, then the routine proceeds to step 34.

In step 34, raw data is collected from the vehicle. Raw data includes any DTC's or PID's that may be useful in assessing vehicle health management of a particular system within the vehicle.

In step 35, data is saved to a circular buffer. The data will be stored and retrieved upon execution of health management algorithms.

In step 36, VHM algorithms are executed. VHM algorithms relate to onboard diagnostics for checking and determining health status of components within the vehicle.

In step 37, based on the output from the VHM algorithms, a determination is made as to whether a red alert is present or whether the VIN is set as upload data. A red alert as described herein is generated from VHM algorithms where some type of error or trouble code is identified. If the determination is made that the red alert is present or that the VIN is set as upload data, then the routine proceeds to step 38; otherwise, the routine returns to step 33 for monitoring whether a VHM algorithm is triggered.

In step 38, data is uploaded prior to a respective period and also after a respective period. The decisions are uploaded to a cloud or similar memory storage device utilizing the telematics device.

In step 39, if a customer warning is justified, then the customer is notified through an app, such as an app on a smart phone, email, or other communication device.

In addition to notifying the customer, in step 40, VHM algorithms are calibrated using data from the vehicles with the warranty or red alert decisions.

In step 41, if required, new parameters or updates to the vehicle HMI or smartphone that execute the advanced VHM algorithms within the vehicle are downloaded.

This process is cost-effective and that a fraction of the entire data is required to upload to the cloud for this respective application. Execution is performed by the processor-based device within the vehicle and only selective data (e.g., 0.5%) is provided to the remote entity.

Figure 3:
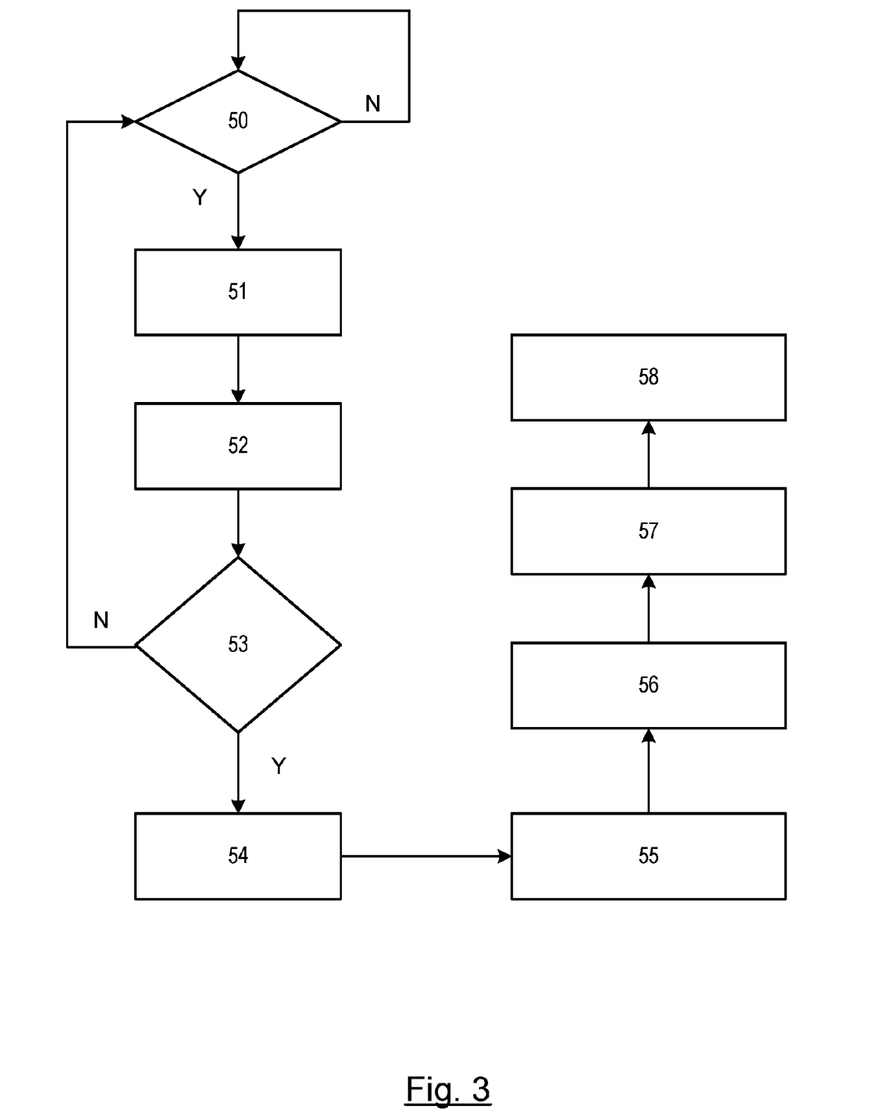
FIG. 3 is a flow chart of a block diagram for identifying message-based diagnostic and prognostic solutions for a communication area network.

FIG. 3 illustrates a flowchart of a block diagram for identifying message-based diagnostic and prognostic solutions for a communication area network (CAN).

Steps 50-54 are executed by the processor-based device. In step 50, a determination is made as to whether a VHM algorithm is triggered. If the determination is made that the VHM algorithm is triggered, then the routine proceeds to step 51; otherwise, the routine continues to loop in check for a triggered VHM algorithm.

In step 51, raw data from the vehicle is collected and is provided to the processor-based device.

In step 52, advanced VHM algorithms within the processor-based device are executed.

In step 53, based on the output from the VHM algorithms, a determination is made whether a red alert is present or whether the VIN is set as upload data. If the determination is made that the red alert is present or that the VIN is set as upload data, then the routine proceeds to step 54; otherwise, the routine returns to step 50.

In step 54, in response to results from the VHM algorithms, decisions from the VHM algorithms are uploaded to the cloud.

In step 55, a vehicle dealership or other service personnel are notified through a service that shares VHM results with dealers. Alternatively emails or any other type of communication distribution service may be used to share the decisions output by the VHM algorithms.

In step 56, if the dealer determines from the decisions that a topology is changed in some form, then the dealer notifies the remote entity (e.g., back office) of the change. The topology is the connection information (e.g., mapping) for all vehicle ECUs and connectors. For example, a battery control module (BCM) is connected to an inline connector X1, whereas inline connector X1 is connected to an engine control module (ECM), ECM is connected to a torque control module (TCM), so on so forth. The topology may also contain distance or resistance values for each connection. The topology information can be used to determine the location of the fault (e.g. bus wire open between BCM and TCM). Changes in the topology may be determined, for example, as to whether the service personnel changed an ECU connection or found the connection was changed by other dealers. Topology information is generated based on the existing connection status. Data is generated in a special format that the VHM algorithm can read.

In step 57, new or updated topology information is generated in response to the notification by the remote entity.

In step 58, the updated topology is downloaded to the application for this respective vehicle that has provided the data.

This process is cost-effective and that no data is required to upload to the cloud for this respective application. Execution is performed by the processor-based device within the vehicle and only decisions as opposed to data are provided to the remote entity.

Figure 4:
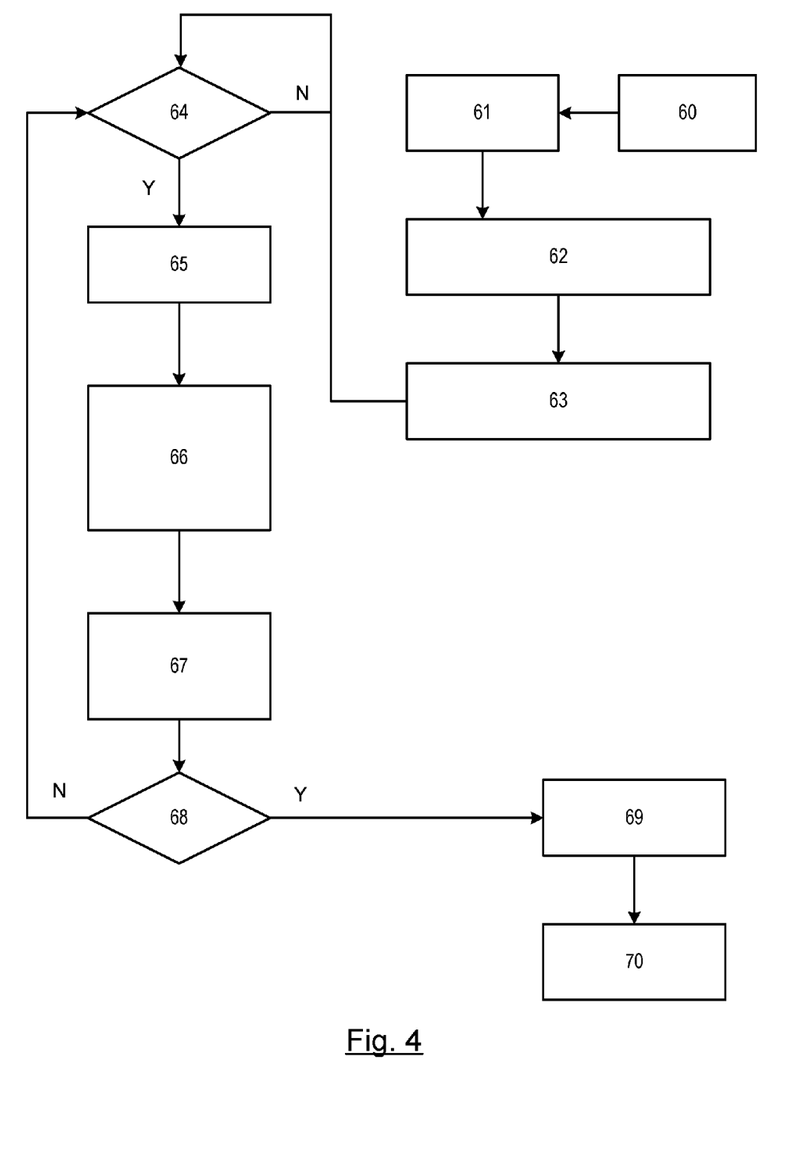
FIG. 4 is a flow chart of a block diagram for predicting remaining useful life.

FIG. 4 illustrates a flow chart of a block diagram for predicting remaining useful life.

Steps 60-63 represent a training phase. Training is initiated for determining the respective degradation life model to use in the processor-based device of the vehicle. A fleet of vehicle VINs is selected for data collection.

In step 61, failure records for the fleet are analyzed for determining time to failure of respective components.

In step 62, a determination is made as to which fleet degradation life model should be used such that the model fits the data trending. A check is made for determining whether the life model predicts that vehicle data is trending in the same direction as the model. This can be determined based on degradation of the vehicle data used in the model compared to data from the all fleet vehicles. A set of models are provided for determining which degradation life model should be selected. Once the model is selected, a determination is made as with the distance between the data and model is minimized. If so, then verification is made that the life model selected is the one that predicts the data trending in the same direction.

In step 63, the fleet degradation life model is downloaded to the processor-based device within the vehicle.

Steps 64-68 are executed by the processor-based device. In step 64, execution of the life degradation model within the processor-based device is initiated by determining whether the VHM algorithm is triggered. If the determination is made that the VHM algorithm is triggered, then the routine proceeds to step 65; otherwise, the routine loops until the VHM algorithm is triggered.

In step 65, raw data is collected from the vehicle. Raw data includes any DTC's or PID's that may be useful in assessing vehicle health management of a particular system within the vehicle.

Figure 5A:
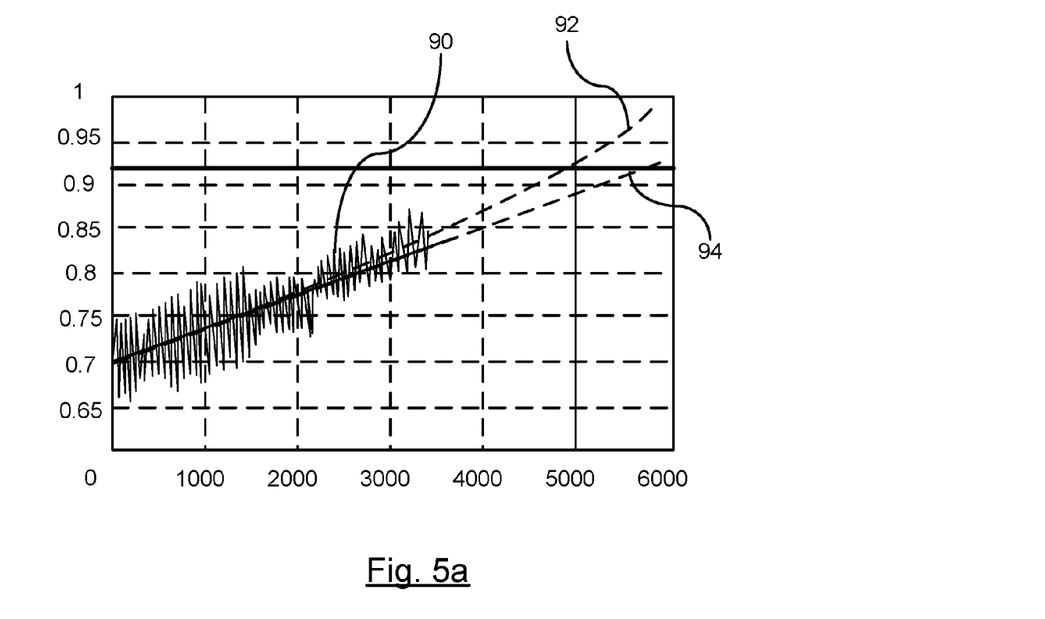
FIGS. 5a and 5b represent exemplary graphs illustrating modle
Figure 5B:
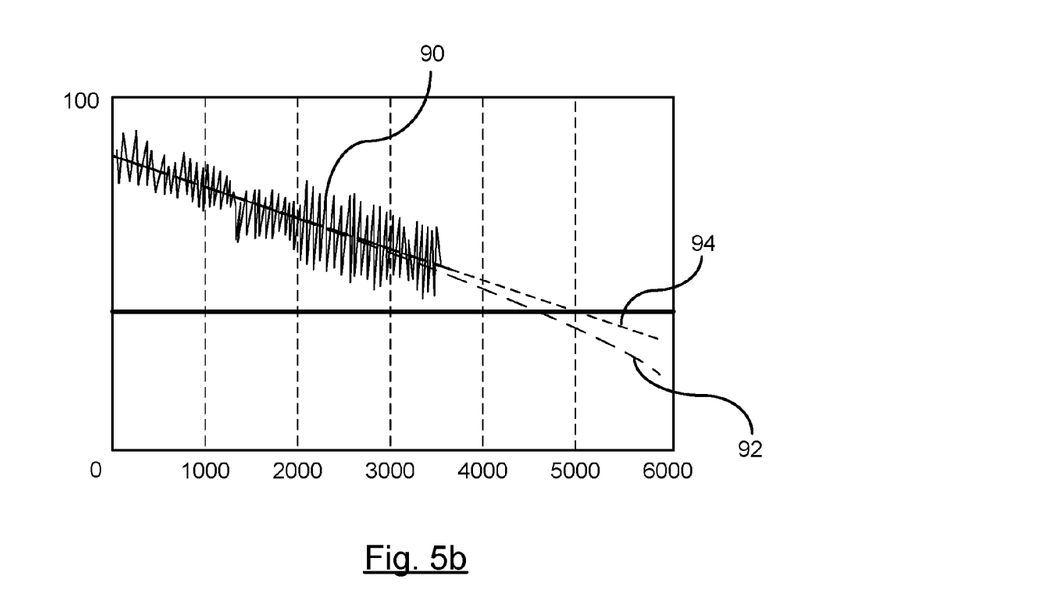

In step 66, current data and historical data are fit to the selected life degradation mode. This is performed as a function of the fleet model. A cluster is formed as a function of trend. By fitting the data from this vehicle, a determination can be made as to whether one particular trend is best for this respective vehicle and verification can be made to assure the data is trending in a direction that is realistic (e.g. state of health become worse not better). The fleet model is input in the vehicle and a best parameter fit is selected based on the current data of this vehicle with minimum mean square error. FIGS. 5a and 5b represent graphs for determining whether the vehicle data is trending in a same direction utilizing a linear fit and polynomial fit. FIG. 5a represents an exemplary graph for resistance and FIG. 5b represents an exemplary graph for state of health. As shown in FIG. 5a, data samples represent the x-axis and resistance values represent the y-axis. Vehicle data is represented by generally at 90. A linear fit model is represented generally by 92 and a polynomial fit model is represented generally by 94. As can seen from the graph, best fit model is selected based on the current data of this vehicle with minimum mean square error. FIG. 5b represents a state of health utilizing a same best fit model.

In step 67, the life model is adjusted for the vehicle component (similar to the process described in step 66) based on its own data to determine the time to failure. As an example, a life model is utilized to have a particular component that follows a Polynomial Regression. If a single component data is plotted against the best fit of the fleet data, and if at any time the component deviates from the fleet data, the parameters of the polynomial regression are adjusted according to the data trend of the single component.

In step 68, a determination is made as to whether the time to failure is nearing. If the time to failure is nearing than the routine proceeds to step 69; otherwise, the routine returns to step 64.

In step 69, a red alert is set if decisions of the life degradation model are uploaded to the cloud or other storage device.

In step 70, the customer is notified via an application or through emails of the time to failure.

Figure 6:
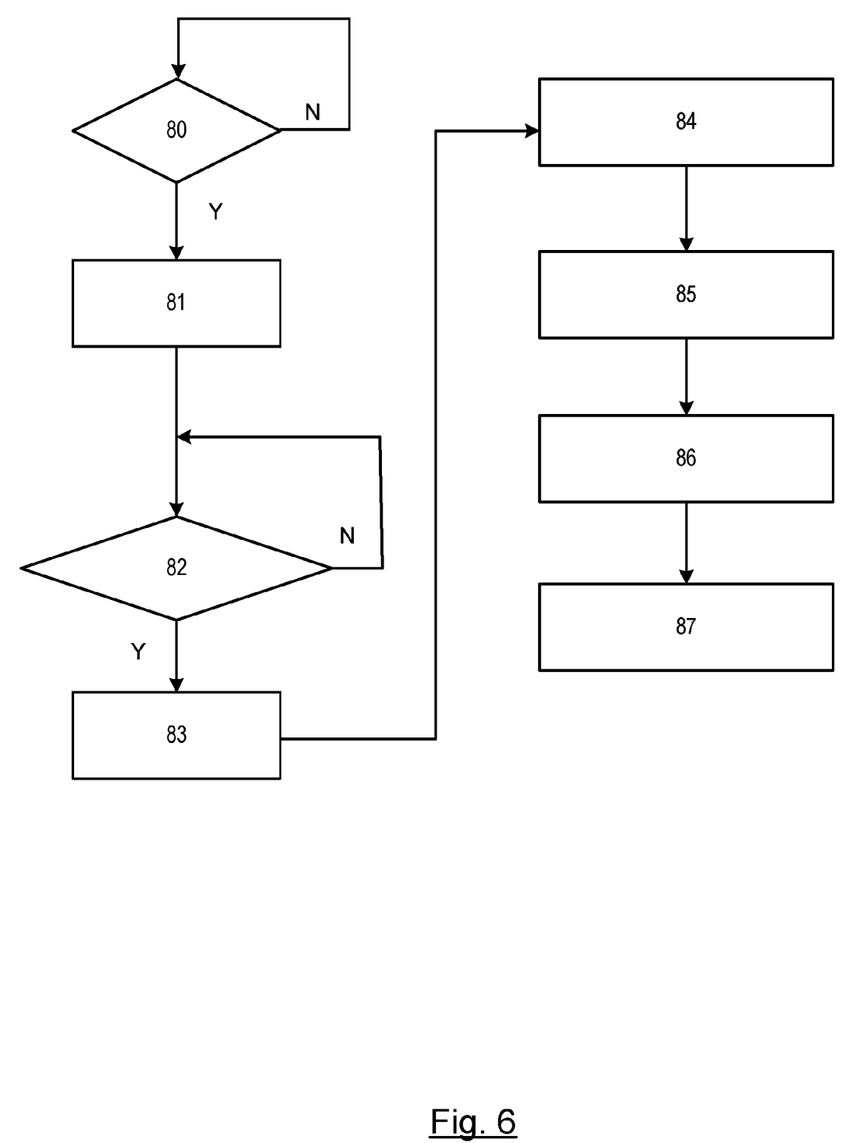
FIG. 6 is a flow chart of a block diagram for calibration of diagnostic algorithms related to DTCs/MILs.

FIG. 6 illustrates a flow chart of a block diagram for predicting a calibration of DTC/MIL (manufacturer indicator lamp) routines.

Steps 80-83 are executed by the processor-based device. Within processor-based device, such as the vehicle HMI or smartphone, advanced diagnostic routines are executed. In step 80, a determination is made as to whether a VHM algorithm is triggered. If the determination is made that the VHM algorithm is triggered, then the routine proceeds to step 81; otherwise, the routine continues to loop to check for a triggered VHM algorithm.

In step 81, raw data from the vehicle is collected and is saved in a circular buffer.

In step 82, a determination is made whether a DTC/MIL has been set within a predetermined number of days. If the determination is made that the DTC/MIL and set within the predetermined number of days, then the routine proceeds to step 83; otherwise the routine continuously loops checking to see whether the DTC/MIL is set within the predetermined number of days.

In step 83, raw data relating to whether the set DTC/MIL is uploaded to a cloud or other storage device.

In step 84, data is analyzed to verify accuracy of the diagnostic algorithms. The may be determined by a data analyst. While DTC corresponding to fuel pump replacement is set, all data for the history since it may be determine that the DTC was set due to the noise. Is so, then the DTC is a false alarm. As a result, accuracy of the algorithm may be determined.

In step 85, in response to verifying accuracy of the diagnostic algorithms, the DTC/MI algorithms are calibrated if required.

In step 86, the calibrated DTC/MIL algorithm is sent to technical specialists or engineers for modifying the code of the algorithms.

In step 87, ECUs are re-flashed to update the algorithms.

While certain embodiments of the present invention have been described in detail, those familiar with the art to which this invention relates will recognize various alternative designs and embodiments for practicing the invention as defined by the following claims.

What is claimed is:

1. A distributed vehicle health management system comprising:
    a vehicle including:
        a vehicle-based diagnostic processor programmed to execute diagnostic routines in the vehicle, the diagnostic routines generating diagnostic data;
        a processor-based device programmed to: receive the diagnostic data generated by the vehicle-based diagnostic processor, execute advanced vehicle health management routines operable to localize, predict and/or mitigate a fault in the diagnostic data, and determine a state of health data of a component as a function of the diagnostic data; and
        a telematics device operable to transmit a subset of the state of health data and/or the diagnostic data from the vehicle, the subset of data selected based on output of the advanced vehicle health management routines; and
    a remote entity disposed remotely from the vehicle, the remote entity including a server and/or a computing device programmed to: receive the selected subset of data via the telematics device, the received selected subset of data being a selective subset of data output from the diagnostic processor and/or the processor-based device, and execute calibration routines as a function of the data received from the vehicle for calibrating diagnostic routines and/or health management routines.

2. The distributed vehicle health management system of claim 1 wherein the calibration routines executed by the remote entity include an advanced vehicle health management calibration routine operable to adjust the VHM routines executed by the processor-based device.

3. The distributed vehicle health management system of claim 1 wherein the calibration routines executed by the remote entity include an onboard diagnostic calibration routine operable to adjust the diagnostic routines executed by the vehicle-based diagnostic processor.

4. The distributed vehicle health management system of claim 1 wherein the processor-based device includes a human machine interface device.

5. The distributed vehicle health management system of claim 1 wherein the processor-based device includes a portable electronic device.

6. The distributed vehicle health management system of claim 5 wherein the processor-based device includes a smartphone.

7. The distributed vehicle health management system of claim 1 wherein the advanced vehicle health management routines are triggered periodically.

8. The distributed vehicle health management system of claim 1 wherein the advanced vehicle health management routines are triggered based on occurrence of an event.

9. The distributed vehicle health management system of claim 1 further comprising a cloud computing service operable to receive and store the selected subset of the diagnostic data and/or the state of health data transmitted via the telematics device, wherein the remote entity receives the selected subset of data via the telematics device through the cloud computing service.

10. The distributed vehicle health management system of claim 9 wherein uploading the selected subset of the state of health data and/or diagnostic data from the vehicle to the cloud computing service is executed in response to a red alert generated by the vehicle health management routines.

11. The distributed vehicle health management system of claim 9 wherein uploading the selected subset of the state of health data and diagnostic data from the vehicle to the cloud computing service is executed in response to the vehicle including a vehicle identification number that is set to upload the selected subset of the state of health data and the diagnostic data to the cloud computing service.

12. The distributed vehicle health management system of claim 1 wherein the remote entity is further programmed to download updated algorithms to the vehicle-based diagnostic processor, the updated algorithms being configured to re-calibrate the diagnostic routines.

13. The distributed vehicle health management system of claim 1 wherein the remote entity is further programmed to download updated parameters to the processor-based device, the updated parameters being configured to re-calibrate the advanced vehicle health management routines.

14. The distributed vehicle health management system of claim 1 wherein the remote entity is further programmed to download updated algorithms to the processor-based device, the updated algorithms being configured re-calibrate the advanced vehicle health management routines.

15. The distributed vehicle health management system of claim 1 wherein a software app downloaded on the processor-based device is programmed to receive a notification of a fault resulting from the advanced vehicle health management routines.

16. The distributed vehicle health management system of claim 1 wherein the vehicle health management routines determine a state of a health of a respective component.

17. The distributed vehicle health management system of claim 1 wherein the vehicle health management routines determine a state of health of diagnostic and prognostic solutions for a communication area network.

18. The distributed vehicle health management system of claim 1 further comprising a cloud computing service operable to receive and store only decisions output from the advanced vehicle health management routines transmitted via the telematics device.

19. The distributed vehicle health management system of claim 1 wherein the vehicle health management routines predict a remaining useful life of a respective component.

20. The distributed vehicle health management system of claim 19 wherein the processor-based device selects a fleet degradation model to determine whether a life model predicts that vehicle data is trending as expected.

21. The distributed vehicle health management system of claim 1 wherein the vehicle health management routines are applied to calibrate at least one of diagnostic trouble code routines and malfunction indicator light routines.

22. A distributed vehicle health management (VHM) system comprising:
  a motor vehicle including:
    a vehicle-based diagnostic processor programmed to execute a diagnostic routine operable to generate diagnostic data for a component of the motor vehicle;
    a processor-based device programmed to: receive the diagnostic data generated by the vehicle-based diagnostic processor, execute an advanced VHM routine operable to localize, predict and/or mitigate a fault in the diagnostic data, and determine state of health data for the component as a function of the diagnostic data; and
    a telematics device operable to communicate with the vehicle-based diagnostic processor and processor-based device, and to transmit from the motor vehicle a subset of the state of health data and the diagnostic data, the subset of data selected based on output of the VHM routine; and
  a remote entity distinct and remote from the motor vehicle, the remote entity including a server and/or a computing device programmed to: receive the selected subset of data via the telematics device, execute a calibration routine as a function of the received selected subset of data to generate updated parameters for calibrating the diagnostic routine and the VHM routine, and download the updated parameters to the vehicle-based diagnostic processor and the processor-based device to adjust the diagnostic routine and the VHM routine.

23. A distributed vehicle health management (VHM) system comprising:
  a motor vehicle including:
    a vehicle-based diagnostic processor programmed to execute a diagnostic routine operable to generate diagnostic data for a component of the motor vehicle;
    a processor-based device programmed to: receive the diagnostic data generated by the vehicle-based diagnostic processor, execute an advanced VHM routine operable to predict a remaining useful life of the component, and determine state of health data for the component as a function of the diagnostic data; and
    a telematics device operable to communicate with the vehicle-based diagnostic processor and processor-based device, and to transmit from the motor vehicle a subset of the state of health data and the diagnostic data, the subset of data selected based on output of the VHM routine; and a remote entity distinct and remote from the motor vehicle, the remote entity including a server and/or a computing device programmed to: receive the selected subset of data via the telematics device, execute a calibration routine as a function of the received selected subset of data to generate updated parameters for calibrating the diagnostic routine and the VHM routine, and download the updated parameters to the vehicle-based diagnostic processor and the processor-based device to adjust the diagnostic routine and the VHM routine, wherein the processor-based device is further programmed to: select a life degradation model, apply current data and historical data to the selected life degradation mode to determine if the applied data is trending in an expected manner for the selected life degradation model, and adjust to the selected life degradation model to determine a time to failure.

\* \* \* \* \*

UNITED STATES PATENT AND TRADEMARK OFFICE
CERTIFICATE OF CORRECTION

PATENT NO. : 9,836,894 B2
APPLICATION NO. : 14/958020
DATED : December 5, 2017
INVENTOR(S) : Xinyu Du et al.

It is certified that error appears in the above-identified patent and that said Letters Patent is hereby corrected as shown below:

In the Claims

Column 7, Line 58, in Claim 14, ", the updated algorithms being configured re-calibrate the advanced vehicle health management routines." should read --, the updated algorithms being configured to re-calibrate the advanced vehicle health management routines.--

Signed and Sealed this
Twenty-fourth Day of July, 2018

Andrei Iancu
*Director of the United States Patent and Trademark Office*